United States Patent Office 3,085,057
Patented Apr. 9, 1963

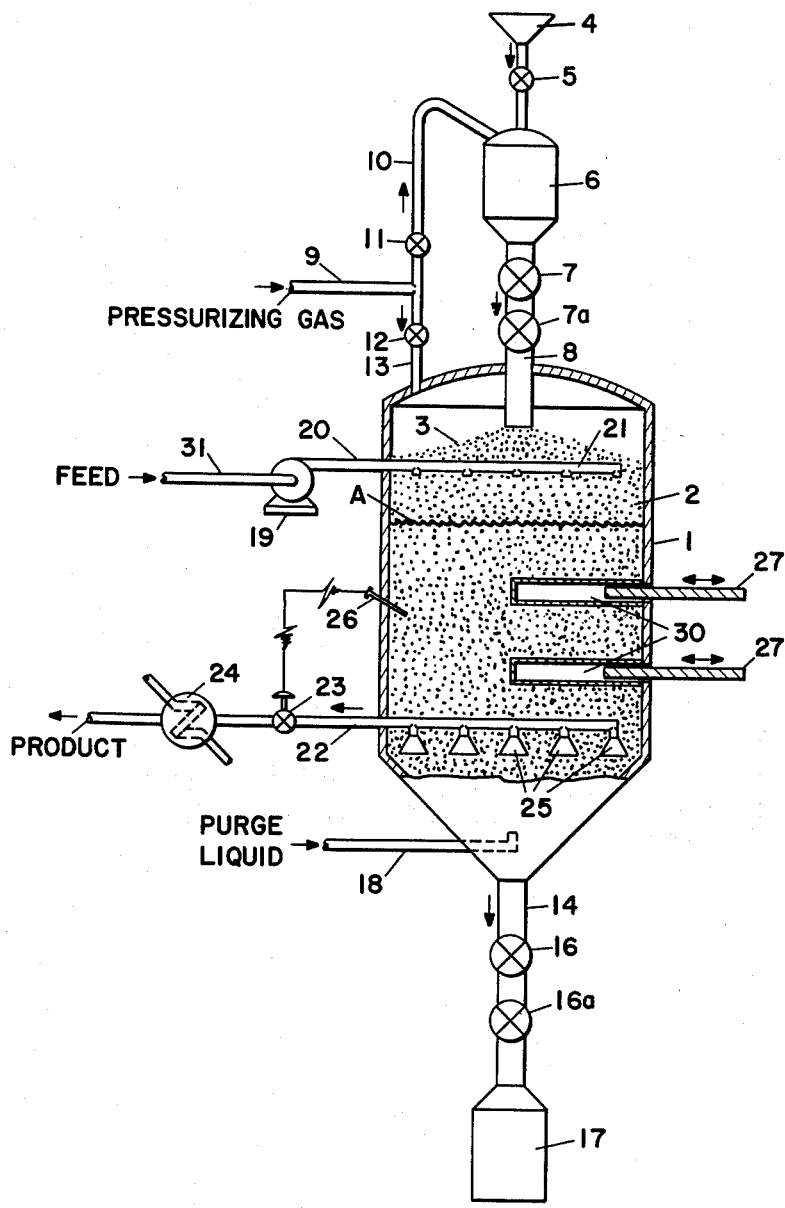

3,085,057
MOVING BED NUCLEAR REACTOR FOR
PROCESS IRRADIATION
Henry J. Ogorzaly, Summit, N.J., assignor to Esso Research and Engineering Company, a corporation of Delaware
Filed Dec. 23, 1957, Ser. No. 704,561
5 Claims. (Cl. 204—154.2)

The present invention is concerned with a method and apparatus for the irradiation of liquid materials, preferably organic materials, and especially petroleum fractions. This invention is based on the use of a moving bed of particulate solids containing fissile material in a liquid processing zone, and critical moderation of a nuclear fission reaction in the processing zone by means of the liquid material undergoing treatment.

In brief compass, the process of this invention comprises maintaining in a reaction zone a bed of solids containing fissile material, which bed contains a critical volume of particulate fissile material which is sufficient under the existing conditions to maintain a chain fission reaction, and passing a liquid material having moderating properties down through the bed. The upper level of the moderating liquid is held somewhat below the top of the bed of solids, and is controlled to regulate the intensity of the fission reaction. In this manner a sustained and controlled nuclear reaction is achieved within the processing zone, and the moderating fluid is exposed to neutron and other irradiations associated with the fission reaction and undergoes conversion. The treated fluid is removed from the lower portion of the reaction zone. The particulate solids can also be intermittently or continuously removed from the lower portion of the processing zone for purposes of regeneration or reconstitution as a suitable nuclear fuel, or for the removal of carbonaceous or mineral deposits.

This invention has the advantage of permitting a sustained nuclear fission reaction to be achieved in the processing zone while providing adequate cooling thereof by the material being processed. Provision for addition and withdrawal of the solids allows for convenient treatment to remove surface deposits, to eliminate neutron-absorbing fission products, and to recover residual or freshly formed fissile material by known chemical or physical means.

Because of the moving bed, the accumulation of surface deposits which may form on the particulate fuel and interfere with the neutron chain reaction, or may result in blocking off of certain segments of the processing zone to the flow of the cooling fluid in the process, is prevented.

In a preferred embodiment of this invention, the flow of the particulate fuel through the processing zone is carried out in such a manner that the fuel is "spent" with regard to its fissile properties at about the same time it would be removed from the reactor for decarbonization or other surface-cleaning treatment.

A principal advantage of the arrangement of this invention is that it permits the fluid being processed to absorb a high proportion of the radiation produced. The amount of radiation lost to the process fluid by self-absorption in the solid fuel, or in other moderators or shielding or structural materials, other than the material being processed, is much less than that occurring in presently known designs or arrangements.

The process feed can be any suitable cooling and neutron moderating liquid, such as hydrocarbons, alcohols, ethers, ketones, carbohydrates, metallo-organic, heterocyclic or other organic compounds or solutions and suspensions of similar materials or of inorganic substances in water, ammonia, or other solvents. The process stream should be in liquid form at the conditions of temperature and pressure existing in the processing zone. Preferably the feed stream has a density of at least 0.2 g./cc. and a viscosity in the range of 0.1 to 1000 centipoises under the reaction conditions, and the ratio of hydrogen atoms to other atoms in the liquid is above 1/1, so that it can most effectively carry out its function as a moderator and coolant.

Hydrocarbons such as petroleum fractions are especially preferred as a feed material. Thus, whole crudes, residua, naphthas, gas oils, shale oils, extracts, asphalts, and the like having a hydrogen content in the range of 8 to 20 weight percent are suitable feed stocks. A distillate petroleum fraction having a boiling point in the range of 400° to 1000° F., a sulfur content below one weight percent, a hydrogen content in the range of 10 to 15 weight percent, and a viscosity at 210° F. in the range of 0.3 to 15 centipoises is a particularly preferred feed stock.

The process of this invention is particularly suited to the conversion of aliphatic hydrocarbons, having in the range of 10 to 25 carbon atoms per molecule, to obtain a distillate lubricant fraction boiling in the range of 600° to 1000° F., atm. eq., and having a viscosity index above 120.

Besides the primary feed stock, other materials can be added to the reaction zone to bring about certain desired conversions. For example, hydrogen or steam can be added at the bottom of the zone and bled off the top to achieve hydro or steam cracking, hydroforming, or hydrofining types of reactions. Light olefins such as ethylene can be similarly admitted and removed from the reaction zone, as can gaseous catalysts such as $BF_3$. Liquid catalysts, olefins, polymerizable monomers, etc. can also be admixed with the down-flowing liquid feed material to obtain desired reactions. Two phase liquid systems can be created where desired for improving the efficacy of the desired reaction, by adding to the principal feed relatively immiscible materials, e.g., methyl ethyl ketone, carbon tetrachloride, or water.

By "fissile material" is meant those isotopes capable of sustaining a nuclear chain reaction by capture of a neutron, fission and the release of more than one additional neutron. Examples known to the art at present are uranium 235 and 233, and plutonium 239. The fuel incorporating these fissile materials can comprise the elements of the same atomic number as the above isotopes containing the natural proportion of the fissile material, or the elements can be enriched with the particular fissile material to any desired extent, as is known in the art. The fissile material can exist in elemental metallic form, or can be in the form of compounds such as oxides and carbides.

By "critical conditions" are meant those conditions wherein the amount, nature and arrangement of the fissile material, and the arrangement of moderating material with respect thereto, are such that a critical mass is achieved, a sustained nuclear chain reaction occurs, and the proportion of neutrons created to neutrons consumed and lost is at least equal to one.

By the term "critical volume" is meant the amount or concentration of fissile material in a given volume which is sufficient to yield a sustained nuclear reaction if a sufficient and proper amount of moderator is present. By "critical moderation" is meant the supplying of sufficient additional moderating material, e.g., the process feed material, to the critical volume of solids in the gravitating solids bed to obtain critical conditions.

The solid material or pellets containing the fissile material may also contain moderating materials such as carbon, beryllium, and other light elements. It is necessary, however, to derive an appreciable portion of the requisite moderation of the nuclear reaction from the process feed material, sufficient to provide an adequate degree of control. Preferably at least 10%, and up to 100%, of the requisite moderation is supplied by the process feed. The more moderation supplied by the process material, the less is the amount of radiant energy lost to extraneous materials in the reaction zone. There is an advantage, however, for including some moderating material in the fuel itself. It allows flexibility in design and increases the range of process fluids to which the invention can be profitably applied. It reduces the sensitivity of the reactor to the moderating effect of the processing material while the control function of the moderating material can still be fully utilized. This permits a lower inventory of the organic material in the reaction zone, and leads to a more compact and cheaper design.

The fissile material exists as a particulate solid, e.g., a pellet, and is roughly round or oval. The solids have a size preferably in the range of $1/16$ to $3/4$ inch. If the size is too small, the cost of fuel preparation becomes excessive and pressure drop across the process zone can be too high. If it is too large, heat removal from the pellets can be inadequate and an excessive amount of radiant energy is lost by self absorption. It is desirable that the solid particles have as uniform a size as possible to create the maximum free liquid volume in the bed, and to prevent packing of the solids. Preferably at least 90% of the particles have a size within ±50% of the median particle size of the bed.

A form of suitable solids is "canned" solids wherein the fissile material in the inside of the solid is covered with an impervious material on the outside. The coating can be, for example, of a metal such as stainless steel, or fused ceramic material. This form of pellet is desirable because the canning prevents to a large extent the contamination of the organic material being processed by the fission products, the fission products being retained within the fuel element or pellets.

Ceramic coated pellets can be formed by compaction of a mix of uranium and beryllium oxides, rolling the formed pellets in an aluminum oxide dust dampened with water or a solution of sodium silicate, and sintering. Such a pellet will contain, besides the fissile material, moderator and coating materials. An example is a pellet having a size of ¼ inch, containing 25 weight percent of uranium oxide, 50 weight percent of beryllium oxide, and 25 weight percent of aluminum oxide coating.

The particulate solids can also be formed from alloys such as uranium in aluminum. Pellet-form alloyed material can be repeatedly dipped in a molten metal such as aluminum, stainless steel, or zirconium alloy to provide an impervious surface.

The fissile-material containing particles or fuel are introduced into the top portion of the reaction or processing zone, and form a bed that contains the critical volume. Preferably the $L/D$ ratio (length/diameter) of the bed is within the range of 0.5 to 3. The process material to be converted, or feed, is also introduced into the upper portion of the reaction zone and a liquid level is established in the zone somewhat below the level of the solids. The amount of feed, i.e., liquid level, in the zone is controlled to regulate the nuclear reaction. Because the organic material supplies the final amount of necessary moderation, the nuclear reaction is quite readily controlled by, and is responsive to, the amount of liquid feed material present in the bed of solids, i.e., responsive to the liquid level.

In a preferred embodiment, the volume of solids present in the reaction zone is in the range of 10 to 1000 cubic feet (c.f.). The free liquid volume of the bed is in the range of 20 to 50%. The heat release is desirably in the range of $2 \times 10^5$ to $2 \times 10^7$ B.t.u.'s/hr./c.f. The fuel burn up, expressed as uranium 235, is in the range of 0.05 to 5 gr./c.f. of bed per day. The average flux of 100+ e.v. neutrons is in the range of $10^{12}$ to $10^{16}$ neutrons per square centimeter per second (n/cm.²/sec.). To obtain satisfactory cooling with hydrocarbon materials, including petroleum fractions, the flow rate is in the range of 20 to 2000 liquid volumes of feed per volume of bed per hour (v./v./hr.). The process fluid temperature can vary substantially but will generally lie in the range of 200 to 700° F. The pressure is usually sufficient to assume liquid phase conditions and lies in the range of atmospheric to 1000 p.s.i. or higher. To achieve optimum performance, the average solids flow rate is in the range of 0.1 to 10 c.f./100 c.f. of bed per day.

Reference to the drawing attached to and forming a part of this specification, and the following description, will serve to make this invention clear. The drawing schematically illustrates one example embodying the teachings of this invention.

Illustrated is a reaction vessel 1 containing a bed of fuel particles 2. Vessel 1 is of any suitable shape such as cylindrical or rectangular. The bed has a level indicated generally at 3. The solids are admitted to this bed via a lock hopper arrangement which comprises an inlet funnel 4, a valve 5, a hopper 6, a metering valve 7, sealing valve 7a and an inlet line 8. The operation of such a device is known to the art. Pressurizing gas is supplied by line 9 to the top of the hopper via branch 10 containing valve 11. Additional gas to control the gas cap, described later, at the top of the vessel 1 is supplied from line 9 by control valve 12 and line 13.

The solids flow down through the bed in a regulated manner and are intermittently or continuously removed from the bottom of vessel 1 via line 14, which contains metering valve 16, a shutoff valve 16a, and ends in receiving hopper 17. To prevent any substantial loss of the product through the solids removal system, a purge system can be set up. For example, a purge liquid such as water can be supplied by line 18 to the bottom of vessel 1, some of it flowing upward to be removed with the product, and the remainder flowing downwardly to fill the receiving hopper and to be removed with the spent fuel.

Both the inlet hopper arrangement and the outlet hopper arrangement are designed to have a relatively small volume, such that a nuclear reaction cannot occur in those areas. The small amount of fuel retained in the zone gives an opportunity for a large neutron loss such that a chain reaction cannot be achieved. Also, the moderating ability of other materials in the zone can be controlled to prevent the obtainance of a sufficient amount of moderation, e.g. hoppers 6 and 17 can be coated with a thin layer of boron.

The organic feed material is introduced into the upper portion of reactor 1 via line 31, pump 19 and line 20. It is suitably distributed in the reactor as by spray ring 21. Substantially all of the feed material under the reaction conditions is maintained in the liquid state, and flows downwardly through the bed, supplying the necessary critical moderation for the nuclear reaction, cooling the solids, and being itself converted. The liquid level A is properly adjusted to achieve the desired nuclear reaction rate and amount of heat release. The gas cap is maintained under pressure above this liquid level to maintain the flow rate of the processed liquid at a sufficiently high level to supply a substantial part or all of the necessary cooling. Some of the cooling can, of course, be done by auxiliary cooling channels, e.g. cooling coils or the like. The irradiated organic material is removed from the lower portion of vessel 1 via line 22 which contains a control valve 23. Because the material has been heated, it is advantageous in some instances to recover this heat as in heat exchanger 24. The heat exchanger 24 is used, for example, for the generation of steam. Line 22 can terminate within vessel 1 in any suitable intake means that will assure the maintenance of a reasonable level. For example, a series of spaced inverted funnels 25 attached to a common manifold is used.

The rate of removal of the product is controlled to control liquid level A. This can be done manually or automatically. For example, a sensing element 26 placed within the reaction zone is used to control valve 23. This sensing element is responsive, for example, to the temperature in the reaction zone. If the temperature were to increase, it would mean that the nuclear reaction rate is increasing and thus element 26 can be set to increase the amount of product removal through valve 23. In this way the liquid level A would be decreased, assuming the feed input to be constant, the amount of moderation would decrease, and thus the nuclear reaction rate would decrease to the desired level. Sensing element 26 could also be sensitive to the neutron flux.

As is customary in nuclear reactions, control rods 27 or equivalent means can also be used as an auxiliary means of controlling the nuclear reaction rate. These are capable of movement in or out of the reaction zone in appropriate channels 30, and can be controlled manually or responsive to significant variables such as neutron flux. These rods are made of high neutron absorbing materials such as cadmium or boron, as is known to the art.

A reflector, not shown, such as a layer of water or graphite can be disposed about vessel 1 to conserve the neutrons, as is known in the art. The whole of the apparatus is, of course, encased where necessary with a biological shield, as of high density concrete.

The spent fuel material removed from hopper 17 is regenerated as desired. If it contains carbonaceous or other surface deposits, these can be removed as by simple burning or by washing in any manner desired. If the fissile material is not spent, the cleaned solids can be returned to hopper 6 for reuse. If the fissile material is substantially spent, then fresh or reconstituted solids can be introduced into hopper 6. The spent fissile material and the fission products can be recovered by known means of chemical reworking and physical separation.

The product removed by line 22 is further treated as desired. It may be desirable to store the product for a time to decrease the amount of induced radioactivity, if any. The radioactivity level of the product, if any, arising from contaminating fission products, can also be improved by conventional separation means such as ion exchange, solvent extraction, distillation, and the like.

*Example*

With reference to the drawing and the above description, this invention will be applied to the conversion of cetane to obtain a polymerized product having a high viscosity index (V.I.) that is admirably useful as a lubricant. The fuel in this example is a ¼ inch diameter pellet clad with a 50-mil thickness of stainless steel and containing an alloy of uranium and stainless steel. The total content of $U^{235}$ enriched to 3% concentration in the fuel used is 50 kg.

The coned bottom reaction vessel 1 has an inside diameter of 6 feet, a straight side length of 10 feet, a cone angle of 60°, and a total volume of 331 cubic feet. The bed height along the straight side is 8 feet. The free liquid volume of the bed is 68 cubic feet. The liquid level A of the cetane and its products undergoing conversion along the straight side is 6 feet. The average neutron flux (100+ e.v. neutrons) below liquid level A is $10^{14}$ neutrons per square centimeter per second (n/cm.²/sec.). The fuel burn-up rate is 0.35 gram of $U^{235}$ per cubic foot of bed per day. The cetane is admitted to the top of the bed by spray ring 21 at a rate of $5 \times 10^6$ pounds per hour and at a temperature of 250° F. The average bed temperature below the liquid level is 300° F., and the product temperature in line 22 is 350° F. The solid fuel is circulated at a rate of 1.0 pound per cubic foot of bed per day. The pressure at the liquid level is 150 p.s.i.

Under these conditions approximately 1 wt. percent conversion of the cetane is obtained per pass, with the following selectivity to the indicated products:

| | Wt. percent |
|---|---|
| Naphtha and lighter cracked products | 8 |
| 700°–900° F., 37.5 SSU at 210° F., 139 V.I. | 20 |
| 900° F.+, 112 SSU at 210° F., 138 V.I. | 72 |

The lighter cracked fractions and the lubricating oil fractions produced are separated by distillation, and unconverted cetane plus the desired proportion of heavier polymerized fractions are recycled to the inlet of the reactor by line 31.

The 700–900° F. fraction is an excellent base stock for formulating multi-grade automotive engine lubricants.

Having described this invention, what is sought to be protected by Letters Patent is succinctly set forth in the following claims.

What is claimed is:

1. A process for producing a high viscosity index lubricant which comprises establishing a bed of free flow particulate solids containing fissile material in a reaction zone, said bed containing a critical volume of said fissile material, passing a relatively cool aliphatic hydrocarbon having in the range of 10 to 25 carbon atoms per molecule downwardly in a liquid state through said bed, establishing an upper liquid level of said aliphatic hydrocarbon below the upper level of said bed, the amount of liquid below said liquid level being sufficient to supply critical moderation to said critical volume whereby a sustained nuclear fission reaction is achieved, controlling the rate of said nuclear reaction responsive to said liquid level, withdrawing heated, irradiated and converted liquid product from the lower portion of said reaction zone and recovering therefrom a distillate lubricant fraction boiling in the range of 600 to 1000° F. and having a viscosity index above 120.

2. A process for carrying out an organic chemical conversion by irradiating a reactive organic liquid neutron moderating coolant material, wherein said reactive material has a hydrogen atom to other atoms ratio above 1/1 which comprises establishing a bed of free flowing p-ticulate solids containing fissile material in a reaction zone, wherein said particulate solids are added to the upper portion of said bed and said solids are withdrawn from the lower portion thereof, said bed containing a critical volume of said fissile material, flowing a relatively cool portion of said liquid material downwardly through said bed, controlling the liquid level of said reactive material in the reaction zone by regulating the feed inlet rate and the product withdrawal rate so as to establish an upper liquid level of said liquid material intermediate to said bed and maintaining sufficient amounts of said material within said bed to supply a critical moderation whereby a sustained nuclear reaction is achieved, withdrawing heated, irradiated and converted liquid product from the lower portion of said reaction zone, and controlling the rate of said nuclear reaction by varying the upper level of said liquid material.

3. A process for carrying out an organic chemical conversion by irradiating a reactive liquid neutron moderating petroleum fraction, which comprises establishing a bed of free flowing particulate solids containing fissile material in a reaction zone, wherein said particulate solids are added to the upper portion of said bed and said solids are withdrawn from the lower portion thereof, said bed containing a critical volume of said fissile material, flowing a relatively cool portion of said liquid petroleum fraction downwardly through said bed, controlling the liquid level of said petroleum fraction in the reaction zone by regulating the feed inlet rate and the product withdrawal rate so as to establish an upper liquid level of said liquid petroleum fraction intermediate to said bed and maintaining sufficient amounts of said petroleum fraction within said bed to supply a critical moderation whereby a sustained nuclear reaction is achieved, withdrawing heated, irradiated and converted liquid product from the lower portion of said reaction zone, and controlling the rate of said nuclear reaction by varying the upper level of said liquid petroleum fraction.

4. The process of claim 3 wherein fresh particulate solids are added to the upper portion of said bed, and spent solids are withdrawn from the lower portion thereof.

5. A process for carrying out an organic chemical conversion by irradiating cetane which comprises establishing a bed of free flowing particulate solids containing fissile material in a reaction zone, wherein said particulate solids are added to the upper portion of said bed and said solids are withdrawn from the lower portion thereof, said bed containing a critical volume of said fissile material, flowing a relatively cool portion of said liquid cetane downwardly through said bed, controlling the liquid level of said reactive cetane in the reaction zone by regulating the feed inlet rate so as to establish an upper liquid level of said liquid cetane intermediate to said bed and maintaining sufficient amounts of said cetane within said bed to supply a critical moderation whereby a sustained nuclear reaction is achieved, withdrawing heated, irradiated and converted liquid product from the lower portion of said reaction zone, and controlling the rate of said nuclear reaction by varying the upper level of said liquid cetane.

References Cited in the file of this patent
UNITED STATES PATENTS

| 2,914,452 | Shutze | Nov. 24, 1959 |

FOREIGN PATENTS

| 697,601 | Great Britain | Sept. 23, 1953 |
| 708,901 | Great Britain | May 12, 1954 |
| 749,064 | Great Britain | May 16, 1956 |
| 756,014 | Great Britain | Aug. 29, 1956 |
| 783,985 | Great Britain | Oct. 2, 1957 |

OTHER REFERENCES

Smyth: "Atomic Energy," Princeton University Press, 1947, page 149.

TID–7525 Proceedings of the SRE-OMRE Forum held Nov. 8 and 9, 1956, Los Angeles, Calif., Atomics International, P.O. Box 309, Canoga Park, Calif., Jan. 15, 1957, pp. 215–227, 229, 231, 232, 233.